United States Patent
Lim

(10) Patent No.: US 9,880,813 B2
(45) Date of Patent: Jan. 30, 2018

(54) RTE CODE GENERATING METHOD AND APPARATUS PERFORMING THE SAME

(71) Applicant: HYUNDAI AUTRON CO., LTD., Seongnam-si (KR)

(72) Inventor: Dae-Hwan Lim, Yongin-si (KR)

(73) Assignee: HYUNDAI AUTRON CO., LTD., Seongnam-si (KR)

( * ) Notice: Subject to any disclaimer, the term of this patent is extended or adjusted under 35 U.S.C. 154(b) by 45 days.

(21) Appl. No.: 14/961,191

(22) Filed: Dec. 7, 2015

(65) Prior Publication Data

US 2016/0170718 A1  Jun. 16, 2016

(30) Foreign Application Priority Data

Dec. 15, 2014  (KR) .................. 10-2014-0180286

(51) Int. Cl.
*G06F 9/44*   (2006.01)
*G06F 9/46*   (2006.01)
*G06F 9/445*  (2006.01)

(52) U.S. Cl.
CPC ............ *G06F 8/30* (2013.01); *G06F 8/33* (2013.01); *G06F 8/34* (2013.01); *G06F 9/46* (2013.01); *G06F 8/36* (2013.01); *G06F 9/44505* (2013.01)

(58) Field of Classification Search
CPC ............... G06F 8/30; G06F 8/34; G06F 8/33
USPC ........................................ 717/106, 107, 111
See application file for complete search history.

(56) References Cited

U.S. PATENT DOCUMENTS

| 6,332,212 B1* | 12/2001 | Organ | G06F 11/323 |
| | | | 714/E11.181 |
| 2003/0236893 A1* | 12/2003 | Nakamura | G06F 9/4843 |
| | | | 709/228 |
| 2005/0091642 A1* | 4/2005 | Miller | G06F 11/3664 |
| | | | 717/124 |
| 2006/0080681 A1* | 4/2006 | Anwar | G06F 9/44521 |
| | | | 719/331 |
| 2006/0101402 A1* | 5/2006 | Miller | G06F 11/3636 |
| | | | 717/124 |

(Continued)

FOREIGN PATENT DOCUMENTS

| KR | 10-2010-0069768 A | 6/2010 |
| KR | 10-2014-0125012 A | 10/2014 |

OTHER PUBLICATIONS

Kim et al., "An AUTOSAR-Compliant Automotive Platform for Meeting Reliability and Timing Constraints" Apr. 2011.*

(Continued)

*Primary Examiner* — Phillip H Nguyen
(74) *Attorney, Agent, or Firm* — Baker McKenzie LLP; Hyunho Park

(57) ABSTRACT

Disclosed is an RTE code generating method including: extracting information of an application by analyzing a plurality of template files; analyzing an operation time for the information of the application with reference to a database of operation times for Run Time Environment (RTE) generation codes; and generating RTE code generation information for the application based on the analysis result. According to the present invention, application software in which operation timing and operation stability are secured can be developed by generating RTE code generation information for an application in consideration of an actual operation time of the application.

8 Claims, 8 Drawing Sheets

(56) References Cited

U.S. PATENT DOCUMENTS

| | | | | |
|---|---|---|---|---|
| 2009/0292791 | A1* | 11/2009 | Livshits | G06F 9/4443 709/217 |
| 2011/0214108 | A1* | 9/2011 | Grunberg | G06F 11/3612 717/128 |
| 2013/0054812 | A1* | 2/2013 | DeCoteau | G06F 8/36 709/226 |
| 2014/0053165 | A1* | 2/2014 | Stellwag | G05B 19/0426 719/312 |

OTHER PUBLICATIONS

Jo et al., "Software Development Tool Design for Automotive Applications" 2009.*
Piao et al., "Design and Implementation of RTE Generator for Automotive Embedded Software" 2009.*
Christopher Mutschler, "Automatic Generation of AUTOSAR Software Component Descriptions" 2009.*
Naumann, "AUTOSAR Runtime Environment and Virtual Function Bus", 2009.*
Mossinger "Software in Automotive Systems", 2010.*
Keahey et a., "Dynamic Creation and Management of Runtime Environments in the Grid", 2003.*
Korean Intellectual Property Office, Office Action for Korean patent application No. 10-2014-0180286, dated Jan. 19, 2016, Korea.
Automotive Real Time Development Using a Timing-augmented AUTOSAR Specification, Oliver Scheickl et al., in Proceedings of ERTS2008, 2008, pp. 1-10, https://www.bmw-carit.com/downloads/publications/.
Towards Hierarchical Scheduling in AUTOSAR, Mikael Asberg et al., MRTC/Malardalen University, Emerging Technologies & Factory Automation, 2009. ETFA 2009. IEEE Conference on Sep. 22-25, 2009.
Timing Modeling and Analysis for AUTOSAR-Based Software Development—A Case Study, Kay Klobedanz et al., University of Paderborn/C-LAB, Design, Automation & Test in Europe Conference & Exhibition (DATE), 2010, Mar. 8-12, 2010, IEEE ISDN 978-3-9810801-6-2/DATE10, pp. 642-645.
Applying Holistic Distributed Scheduling to AUTOSAR Methodology, Ahmed Daghsen et al., Embedded Real Time Software and Systems(ERTSS), May 2010, Toulouse, France. http://www.erts2010.org/, 2010. <hal-00660252>.
How Timing Interfaces in AUTOSAR can Improve Distributed Development of Real-Time Software, Oliver Scheickl et al., INFORMATIK 2008, Beherrschbare Systeme-dank Informatik Band 2, Beitrage der 38. Jahrestagung der Gesellschart fur Informatik e. V. (GI), Sep. 8-13, 2008, https://www.bmw-carit.de/downloads/publications/.
German Patent Office, Office Action for German Patent Application No. 10 2015 120 462.2, dated Nov. 17, 2016, Germany.

* cited by examiner

RTE CODE GENERATING METHOD AND APPARATUS PERFORMING THE SAME

CROSS-REFERENCE TO RELATED APPLICATIONS

This application claims the priority of Korean Patent Application No. KR 10-2014-0180286 filed on Dec. 15, 2014, in the Korean Intellectual Property Office, the disclosure of which is incorporated herein by reference.

BACKGROUND

1. Technical Field

The present invention relates to an RTE code generating method and an apparatus performing the same.

2. Description of the Related Art

In general, an electronic device system mounted on a vehicle includes a number of ECUs in which software and hardware are integrated. However, due to a dependent attribute of hardware generated in a software developing process, there occurs a difficulty in integrating electronic device systems mounted on a vehicle and an implantation performance between pieces of software deteriorates.

According to the related art, a runtime environment in a standard architecture is a scheme that supports communication between allocated software components, and between an upper level software component and a lower level basic software component so that a mapped software component may be executed on ECU hardware and basic hardware.

However, an operation of creating a runtime environment based on settings of an upper level application and lower level basic software requires much time and great efforts.

SUMMARY

Therefore, the present invention provides an RTE code generating method and an apparatus performing the same, by which application software in which operation timing and operation stability are secured can be developed by generating RTE code generation information for an application in consideration of an actual operation time of the application.

The objects of the present invention are not limited to the above-mentioned ones, and other objects will be made clear to those skilled in the art from the following description.

In accordance with an aspect of the present invention, there is provided an RTE code generating method including: extracting information of an application by analyzing a plurality of template files; analyzing an operation time for the information of the application with reference to a database of operation times for Run Time Environment (RTE) generation codes; and generating RTE code generation information for the application based on the analysis result.

According to an embodiment, extracting information of an application by analyzing a plurality of template files may include: extracting the information of the application including at least one of the type of the application, the type of an OS task in which the application is mapped, and an event associated with the application.

According to an embodiment, extracting information of an application by analyzing a plurality of template files may include: when the type of the application is a periodic operational application, extracting network information used to transmit data while the application is operated.

According to an embodiment, extracting information of an application by analyzing a plurality of template files may include: when the type of the application is a non-periodic operational application, extracting information on a function used when data are transmitted to another application in the application.

According to an embodiment, analyzing an operation time for the information of the application with reference to a database of operation times for Run Time Environment (RTE) generation codes may include: analyzing an operation time of a code corresponding to the information of the application with reference to a database of operation times for Run Time Environment (RTE) generation codes.

According to an embodiment, generating RTE code generation information may include: generating the RTE code generation information by determining the form of an RTE code and the type of the RTE code based on the analysis result.

According to an embodiment, the plurality of template files may include at least one of a software component template file for the application, an RTE template file, and an OS template file.

In accordance with another aspect of the present invention, there is provided an RTE code generating apparatus including: an RTE generation code operation time database in which operation times for Run Time Environment (RTE) generation codes are stored; an application information extracting unit that extracts information of an application by analyzing a plurality of template files; an operation time analyzing unit that analyzes an operation time for the information of the application with reference to a database of operation times for RTE generation codes; and an RTE code generation information generating unit that generates RTE code generation information for the application based on the analysis result.

According to an embodiment, the application information extracting unit may extract information of the application including at least one of the type of the application, the type of an OS task in which the application is mapped, and an event associated with the application.

According to an embodiment, when the type of the application is a periodic operational application, the application information extracting unit may extract network information used to transmit data while the application is operated.

According to an embodiment, when the type of the application is a non-periodic operational application, the application information extracting unit may extract information on a function used when data are transmitted to another application in the application.

According to an embodiment, the operation time analyzing unit may analyze an operation time of a code corresponding to the information of the application with reference to a database of operation times for RTE generation codes.

According to an embodiment, the RTE code generation information generating unit may generate the RTE code generation information by determining the form of an RTE code and the type of the RTE code based on the analysis result.

According to an embodiment, the plurality of template files may include at least one of a software component template file for the application, an RTE template file, and an OS template file.

Detailed items of the other embodiments are included in the detailed description and the accompanying drawings.

The above and other aspects, features and advantages of the invention will become apparent from the following description of the following embodiments given in conjunction with the accompanying drawings. However, the present invention is not limited to the embodiments disclosed below, but may be implemented in various forms. The embodiments of the present invention is provided to make the disclosure of the present invention complete and fully inform those skilled in the art to which the present invention pertains of the scope of the present invention. The same reference numerals denote the same elements throughout the specification.

According to the present invention, application software in which operation timing and operation safety are secured can be developed by generating RTE code generation information for an application in consideration of an actual operation time of the application.

DETAILED DESCRIPTION

Hereinafter, exemplary embodiments of the present invention will be described in detail with reference to the accompanying drawings.

The term "OS task" used in the specification refers to an operating unit of an application. One or a plurality of applications may be mapped in the OS task. When a plurality of applications are mapped in the OS task, a unit piece of software may be operated according to a sequence determined by the user.

The term "non-periodic operational application" used in the specification refers to an application that is operated only when a specific request is made.

The term "periodic operational application" used in the specification refers to an application that is operated automatically.

Figure 1:
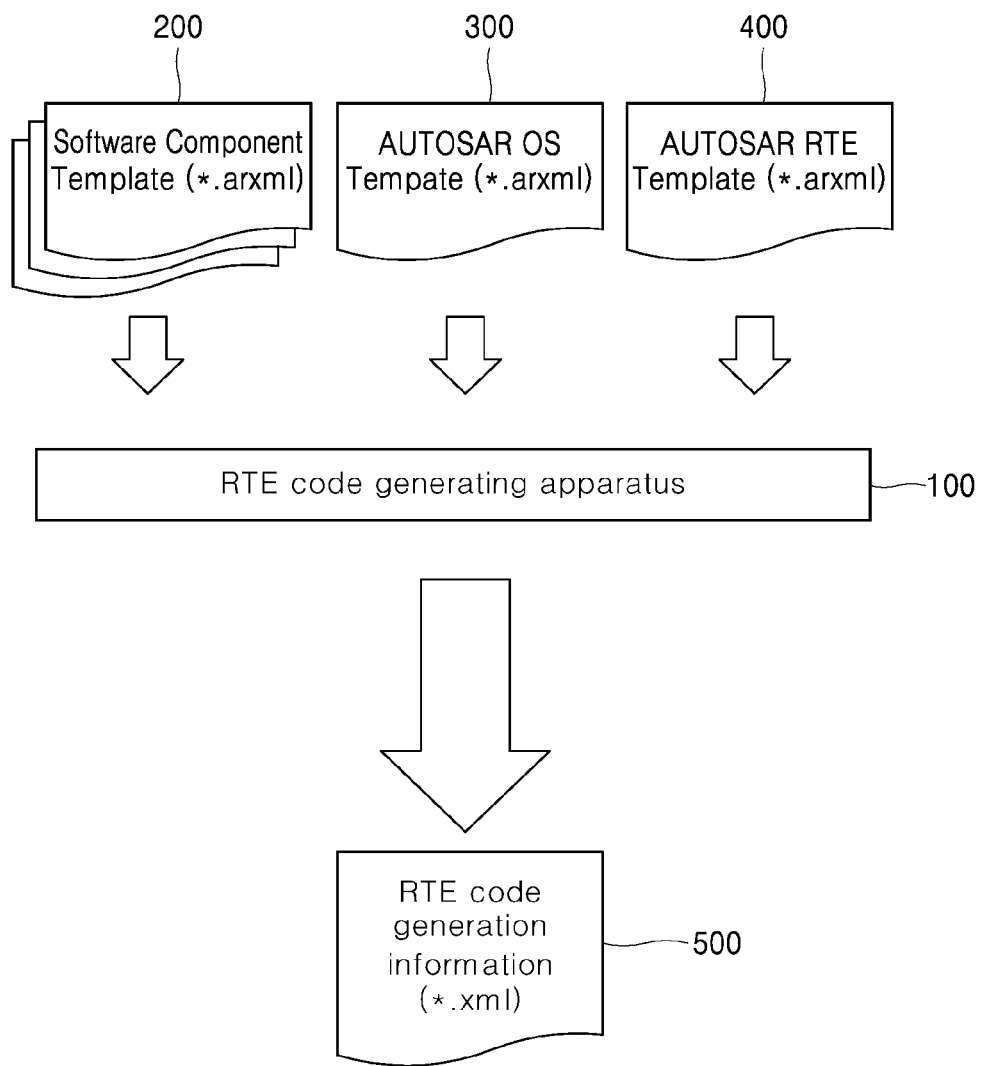
FIG. 1 is a view illustrating an RTE code generating apparatus according to the present invention.

FIG. 1 is a view illustrating an RTE code generating apparatus according to the present invention.

Referring to FIG. 1, the RTE code generating apparatus 100 receives a software component template file 200 for an application, an RTE template file 300, and an OS template file 400.

The RTE code generating apparatus 100 may extract the type of the application by analyzing the software component template file 200 for the application, and may extract network information according to the type of the application.

In one embodiment, when the type of the application is a periodic operational application, the RTE code generating apparatus 100 may extract network information used to transmit data during an operation of the application.

In another embodiment, when the type of the application is a non-periodic operational application, the RTE code generating apparatus 100 may extract information on a function used when data are transmitted to another application in the application.

The RTE code generating apparatus 100 may extract the type of an OS task used during an operation of the application and an operation method of the application by analyzing the RTE template file 300.

The RTE code generating apparatus 100 may extract the type of the OS task by analyzing the OS template file 400.

Thereafter, the RTE code generating apparatus 100 may analyze an operation time for the extracted information with reference to a database of operation times for RTE generation codes, and may generate the RTE code generation information 500 for the application based on the analysis result.

Figure 2:
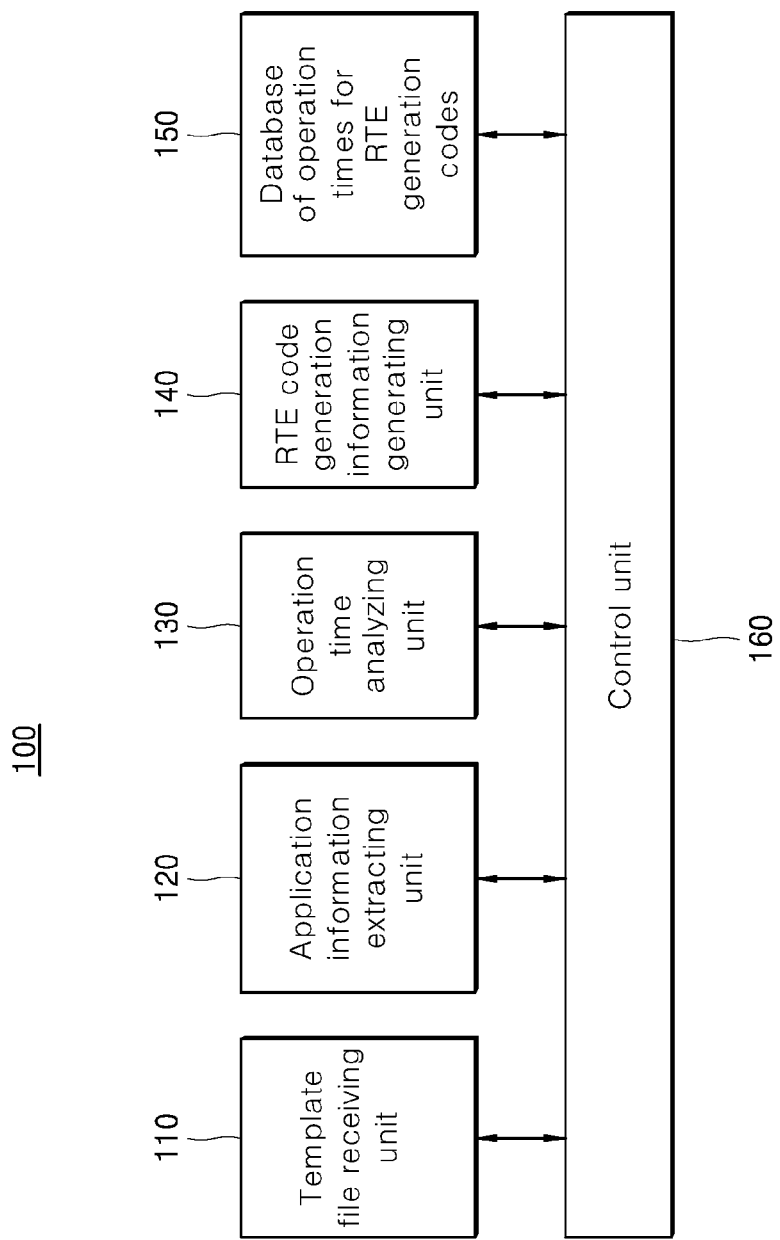
FIG. 2 is a block diagram illustrating an internal structure of an RTE code generating apparatus according to an embodiment of the present invention.

FIG. 2 is a block diagram illustrating an internal structure of an RTE code generating apparatus according to an embodiment of the present invention.

Referring to FIG. 2, the RTE code generating apparatus 100 includes a template file receiving unit 110, an application information extracting unit 120, an operation time analyzing unit 130, an RTE code generation information generating unit 140, an RTE generation code operation time database 150, and a control unit 160.

The template file receiving unit 110 receives a plurality of template files and provides the received template files to the application information extracting unit 120. Here, the plurality of template files may include at least one file of a software component template file for an application, an RTE template file, and an OS template file.

The application information extracting unit 120 may extract information of the application by analyzing a plurality of template files, and provides the extracted information to the operation time analyzing unit 130.

In one embodiment, the application information extracting unit 120 may extract the type of the application by analyzing the software component template file for the application, and may extract network information according to the type of the application.

When the type of the application is a periodic operational application, the application information extracting unit 120 may extract network information used to transmit data during an operation of the application.

Meanwhile, when the type of the application is a non-periodic operational application, the application information extracting unit 120 may extract information on a function used to transmit data to another application in the application.

In another embodiment, the application information extracting unit 120 may extract the type of an OS task used during an operation of an application and an operation method of the application by analyzing an RTE template file.

In another embodiment, the application information extracting unit 120 may extract the type of an OS task by analyzing an OS template file.

The operation time analyzing unit 130 analyzes an operation time for information of the application extracted by the application information extracting unit 120 with reference to the RTE generation code operation time database 150, and provides the analysis result to the RTE code generation information generating unit 140.

The RTE code generation information generating unit 140 generates RTE code generation information based on an operation time for the information of the application analyzed by the operation time analyzing unit 130.

Figure 3:
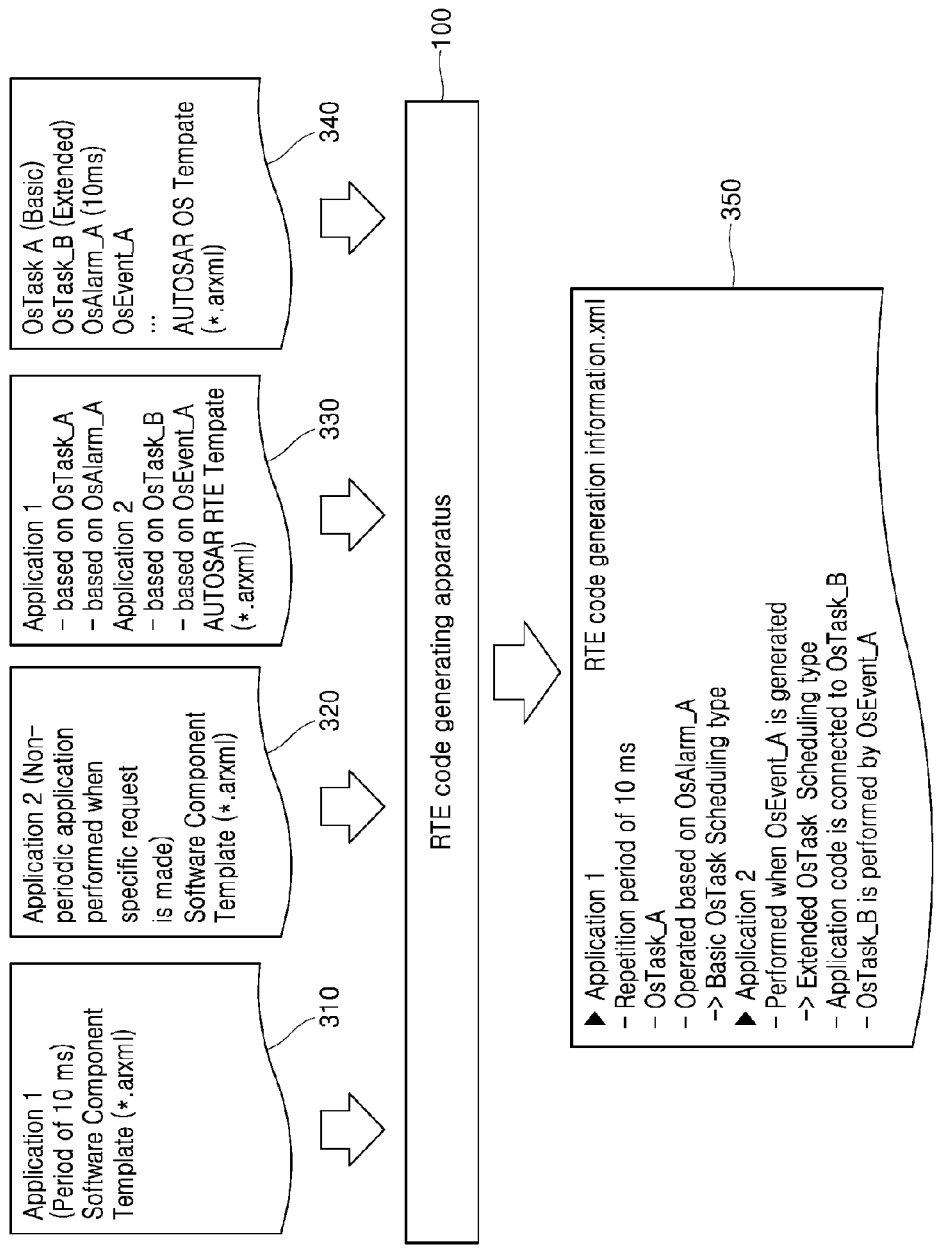
FIG. 3 is an exemplary view illustrating an execution process of an RTE code generating apparatus according to the present invention.

FIG. 3 is an exemplary view illustrating an execution process of an RTE code generating apparatus according to the present invention. The embodiment disclosed in FIG. 3 relates to an embodiment in which the RTE code generating apparatus may extract scheduling information by analyzing a plurality of template files.

The RTE code generating apparatus 100 receives the plurality of template files. For example, the RTE code generating apparatus 100 receives a software component template file 310 for Application 1, a software component template file 320 for Application 2, an RTE template file 330, and an OS template file 340.

The RTE code generating apparatus 100 extracts the type of an application by analyzing a software component template file for an application.

For example, the RTE code generating apparatus 100 extracts information that the type of Application 1 is a periodic operational application and is operated for every 10 ms by analyzing the software component template file 310 for Application 1.

In another example, the RTE code generating apparatus 100 extracts information that the type of Application 2 is a non-periodic operational application and is operated when a characteristic request is made by analyzing the software component template file 320 for Application 2.

The RTE code generating apparatus 100 extracts the type of an OS task used during an operation of the application and an operation method of the application by analyzing the RTE template file.

For example, the RTE code generating apparatus 100 may extract information that an OS task used during an operation of Application 1 is OsTaskA and is operated by OsAlarm_A by analyzing the RTE template file 330. Furthermore, the RTE code generating apparatus 100 may extract information that an OS task used during an operation of Application 2 is OsTask_B and is operated by OsEvent_A by analyzing the RTE template file.

The RTE code generating apparatus 100 extracts the type of an OS task by analyzing an OS template file.

For example, the RTE code generating apparatus 100 may extract information that the type of OsTask_A is basic and the type of OsTask_B is extended by analyzing an OS template file 340.

Thereafter, the RTE code generating apparatus 100 may analyze an operation time for the extracted information with reference to a operation time database for an RTE generation code, and may generate the RTE code generation information 350 for the application based on the analysis result.

Figure 4:
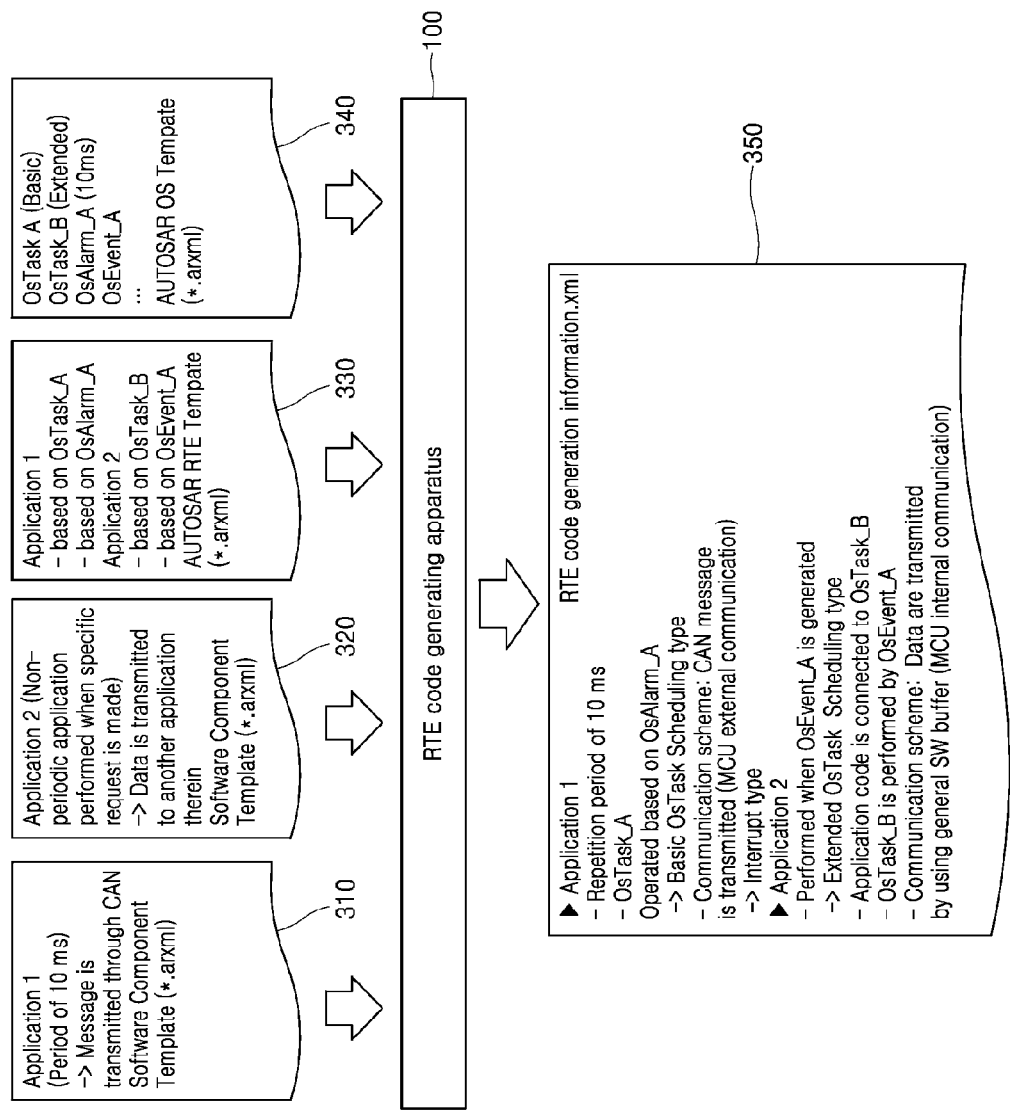
FIG. 4 is an exemplary view illustrating an execution process of an RTE code generating apparatus according to the present invention.

FIG. 4 is an exemplary view illustrating an execution process of an RTE code generating apparatus according to the present invention. The embodiment disclosed in FIG. 4 relates to an embodiment in which the RTE code generating apparatus may extract communication scheme information by analyzing files of a plurality of templates.

Referring to FIG. 4, the RTE code generating apparatus 100 receives files of the plurality of templates. For example, the RTE code generating apparatus 100 receives a software component template file 310 for Application 1, a software component template file 320 for Application 2, an RTE template file 330, and an OS template file 340.

The RTE code generating apparatus 100 extracts network information used to transmit data while an application is operated when the type of the application is a periodic operational application by analyzing a software component template file for the application.

For example, the RTE code generating apparatus 100 extracts information that data are transmitted through a CAN network when Application 1 is operated, by analyzing the software component template file 310 for Application 1.

The RTE code generating apparatus 100 extracts information on a function used to transmit data to another application in the application when the type of the application is a non-periodic operational application by analyzing a software component template file for the application.

For example, the RTE code generating apparatus 100 may extract information that Application 2 is operated by a specific request and an Rte_Write_Application 1 function in a communication form using a software buffer should be provided because data are transmitted to another application in Application 2, by analyzing a software component template file 320 on Application 2.

The RTE code generating apparatus 100 may generate RTE code generation information 350 using the extracted information.

In one embodiment, the RTE code generating apparatus 100 may analyze an operation time for the extracted information with reference to a operation time database for an RTE generation code, and may generate the RTE code generation information 350 for the application based on the analysis result.

Figure 5:
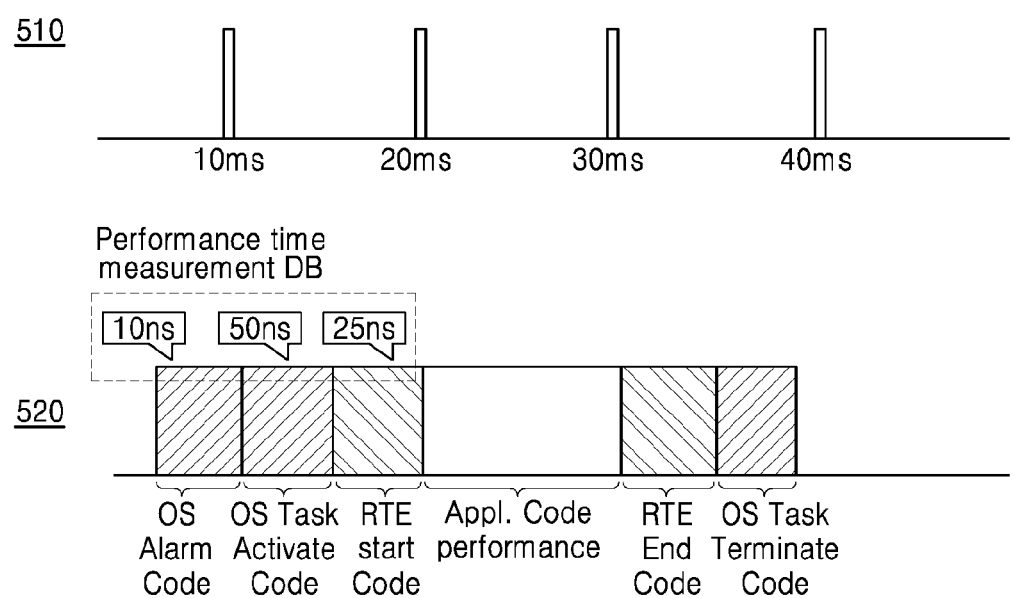
FIG. 5 is a reference view for explaining a process of verifying a simulation for RTE code generation information according to the present invention.

FIG. 5 is a reference view for explaining a process of verifying a simulation for RTE code generation information according to the present invention.

Referring to FIG. 5, according to the related art, when RTE code generation information is that Application 1 is operated for every 10 ms and the type of an OS task used during an operation thereof is Basic, Application 1 is operated at 10 ms, 20 ms, 30 ms, and 40 ms as indicated reference numeral 510.

However, the application analyzing unit may receive RTE code generation information from the RTE code generating apparatus 100 (see FIG. 1), may analyze timing for the RTE code generation information with reference to a database on operation times for RTE generation codes, and may manage a timing error based on the analysis result.

For example, the application analyzing unit analyzes that an operation time of an OS Alarm code of the RTE code generation information is 10 ns, an operation time of an OS Task Activate code is 50 ns, and an operation time of an RTE start code is 25 ns, with reference to the database on operation times for RTE generation codes. The application analyzing unit may identify whether an integrity of an operation is not present (in particular, in an aspect of timing).

The present invention guarantees operation timing as indicated by reference 520 because the RTE code generating apparatus 100 generates RTE code generation information for an application based on an analysis result on an operation time of the application.

Figure 6:
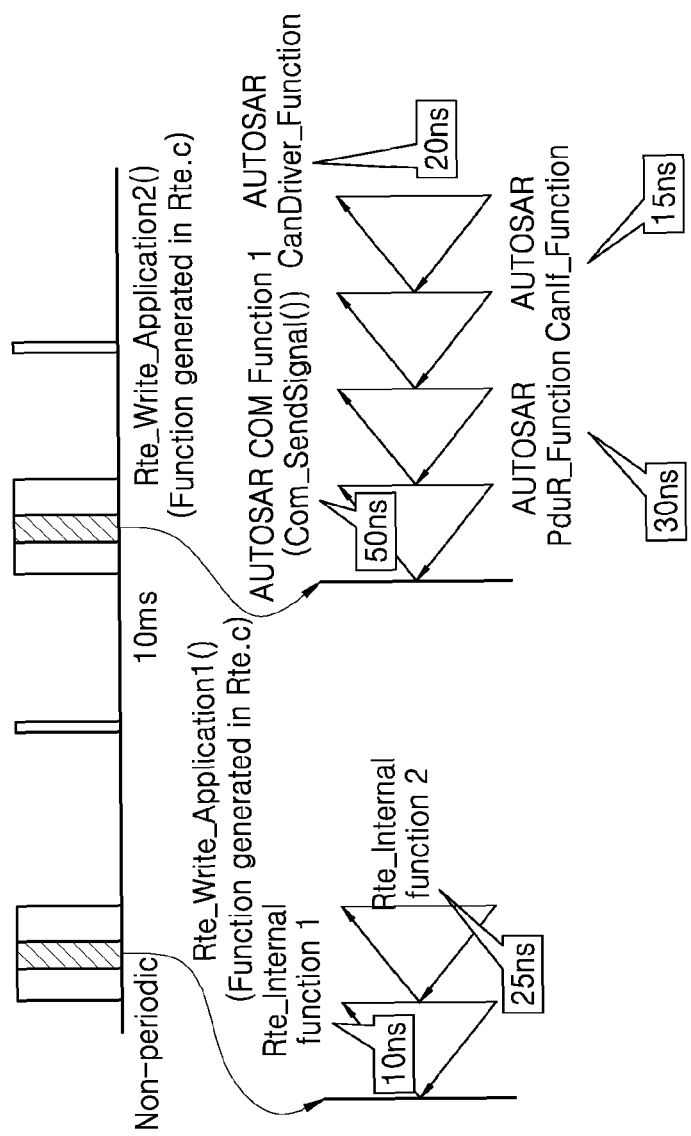
FIG. 6 is a reference view for explaining a process of verifying a simulation for RTE code generation information according to the present invention.

FIG. 6 is a reference view for explaining a process of verifying a simulation for RTE code generation information according to the present invention.

Referring to FIG. 6, the RTE code generating apparatus 100 (see FIG. 1) may extract information that an Rte_Write_Application1( ) function in a communication form using a software buffer should be provided because an application is operated by a specific request and data are transmitted to another application in the application, by analyzing a software component template file on the application.

The application analyzing unit analyzes an operation time of an Rte_Write_Application1( ) function of the RTE code generation information generated by the RTE code generating apparatus 100 with reference to a database on operation times for RTE generation codes. For example, the RTE code generating apparatus 100 may analyze an operation time of an Rte_internal function 1 as being 10 ns and may analyze an operation time of an Rte_internal function 2 as being 25 ns with reference to the database for operation times for RTE generation codes.

The RTE code generating apparatus 100 may extract network information used to transmit data while an application is operated for a specific period by analyzing a software component template file for the application. Furthermore, the application analyzing unit may analyze a timing of the RTE code generation information generated by the RTE code generating apparatus 100 with reference to a database on operation times for RTE generation codes.

For example, the application analyzing unit may analyze that an operation time of an AUTOSAR COM( ) function used to transmit data when an Rte_Write_Application2( ) function of the RTE code generation information is executed, an operation time of an AUTOSAR PduR( ) function is 30 ns, an operation time of an AUTOSAR_Canlf( ) is 15 ns, and an operation of an AUTOSAR CanDriver function is 20 ns, with reference to the database for operation times for RTE generation codes.

Figure 7:
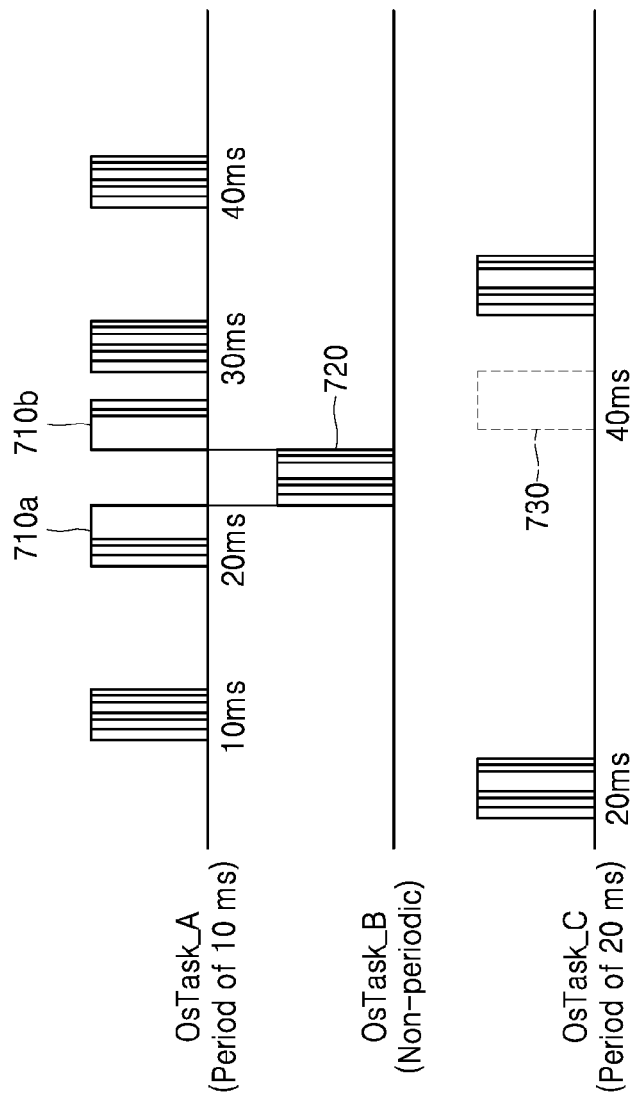
FIG. 7 is a reference view for explaining a process of verifying a simulation for RTE code generation information according to the present invention.

FIG. 7 is a reference view for explaining a process of verifying a simulation for RTE code generation information according to the present invention.

Referring to FIG. 7, the type of an application mapped in OsTask_A is a periodic operational application and the application is operated at every 10 ms. The type of an application mapped in OsTaskB_is a non-periodic operational application, and the application is executed according to an operation request by OsTask_A. The type of an application mapped in OsTask_C is a periodic operational application and the application is operate at every 20 ms.

For example, if an operation of the application mapped in OsTask_C is ended, the application mapped in OsTask_A is operated. OsTask_A is operated again at the next period. The application 710a mapped in OsTask_A requests an execution of an application 720 mapped in OsTask_B in an execution process, and if the execution of the application 720 mapped in OsTaskB_is ended, the remaining application 710b of the application 710a mapped in OsTask_A, which is not executed, is executed.

However, due to a call of OsTask_A, OsTask_B is performed such that OsTask_C is not executed in a period of its own but is postponed to a time point when the second period of OsTask_A ends.

In this way, the present invention can develop application software in which operation timing and an operation stability are secured, by generating RTE code generation information on an application in consideration of an actual operation time of the application.

Figure 8:
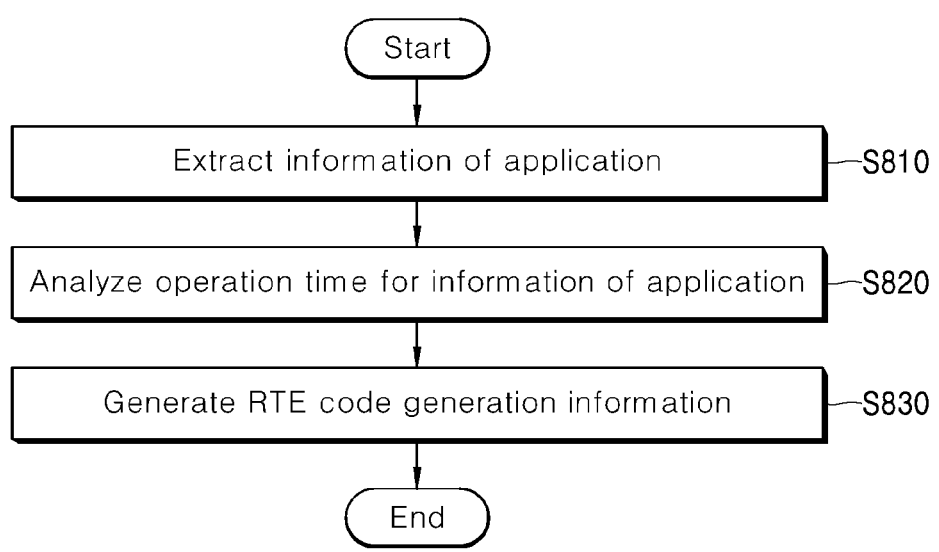
FIG. 8 is a flowchart illustrating an embodiment of an RTE code generating method according to the present invention.

FIG. 8 is a flowchart illustrating an embodiment of an RTE code generating method according to the present invention.

Referring to FIG. 8, the RTE code generating apparatus 100 (see FIG. 1) extracts information of an application by analyzing a plurality of template files (step S810).

In an embodiment of step S810, the RTE code generating apparatus 100 may extract information of an application including at least one of the type of the application, the type of an OS task in which the application is mapped, and an event associated with the application, by analyzing a plurality of template files.

In another embodiment of step S810, when the type of an application is a periodic operational application, the RTE code generating apparatus 100 may extract network information used to transmit data during an operation of the application.

In another embodiment of step S810, when the type of an application is a non-periodic operational application, the RTE code generating apparatus 100 may extract information for a function used when data are transmitted to another application in the application.

The RTE code generating apparatus 100 analyzes an operation time for information of an application with reference to a database of operation times for RTE generation codes (step S820).

In an embodiment of step S820, the RTE code generating apparatus 100 may analyze an operation time of a code corresponding to information of the application with reference to the database of operation times for RTE generation codes.

The RTE code generating apparatus 100 generates RTE code generation information on the application based on the analysis result (step S830).

In an embodiment of step S830, the RTE code generating apparatus 100 may generate the RTE code generation information by determining the form of the RTE code and the type of the RTE code based on the analysis result.

Although the exemplary embodiments of the present invention have been described until now, it is noted that various modifications may be made without departing from the scope of the present invention. Therefore, the scope of the present invention is not limited to the described embodiments, but should be determined by the equivalents of the claims together with the claims.

Although the present invention has been described with reference to the limited embodiments and the drawings, the present invention is not limited to the embodiments, but various corrections and modifications may be made from the description by those skilled in the art to which the present invention pertains. Accordingly, the technical spirit of the present invention should be recognized only by the claims, and the equivalents and the equivalent modifications thereof also fall within the scope of the present invention.

What is claimed is:

1. A Run Time Environment (RTE) code generating method comprising:
    extracting information of an application comprising at least one of the type of the application, the type of an OS task in which the application is mapped, and an event associated with the application by analyzing a plurality of template files;
    analyzing an operation time of a code corresponding to the information of the application with reference to a database of operation times for RTE generation codes; and
    generating RTE code generation information by determining the form of an RTE code and the type of the RTE code based on the analysis result.

2. The RTE code generating method of claim 1, wherein extracting information of an application by analyzing a plurality of template files comprises: when the type of the application is a periodic operational application, extracting network information used to transmit data while the application is operated.

3. The RTE code generating method of claim 1, wherein extracting information of an application by analyzing a plurality of template files comprises: when the type of the application is a non-periodic operational application, extracting information on a function used when data are transmitted to another application in the application.

4. The RTE code generating method of claim 1, wherein the plurality of template files comprise at least one of a software component template file for the application, an RTE template file, and an OS template file.

5. A Run Time Environment (RTE) code generating apparatus comprising:

memory for an RTE generation code operation time database in which operation times for RTE generation codes are stored; and a processor, the processor:

extracting information of an application by comprising at least one of the type of the application, the type of an OS task in which the application is mapped, and an event associated with the application;

analyzing an operation time of a code corresponding to the information of the application with reference to a database of operation times for RTE generation codes; and generating RTE code generation information for the application by determining the form of an RTE code and the type of the RTE code based on the analysis result.

6. The RTE code generating apparatus of claim 5, wherein when the type of the application is a periodic operational application, the application information extracting unit extracts network information used to transmit data while the application is operated.

7. The RTE code generating apparatus of claim 5, wherein when the type of the application is a non-periodic operational application, the application information extracting unit extracts information on a function used when data are transmitted to another application in the application.

8. The RTE code generating apparatus of claim 5, wherein the plurality of template files comprise at least one of a software component template file for the application, an RTE template file, and an OS template file.

\* \* \* \* \*